(12) United States Patent
Gao et al.

(10) Patent No.: US 7,916,662 B2
(45) Date of Patent: Mar. 29, 2011

(54) METHOD AND APPARATUS FOR DETERMINING DATA CENTER RESOURCE AVAILABILITY USING MULTIPLE TIME DOMAIN SEGMENTS

(75) Inventors: Jingrong Gao, Richmond Hill (CA); Michael George Polan, Markham (CA); Alex Kwok Kee Tsui, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/538,403

(22) Filed: Aug. 10, 2009

(65) Prior Publication Data
US 2009/0292577 A1 Nov. 26, 2009

Related U.S. Application Data

(63) Continuation of application No. 11/121,533, filed on May 4, 2005, now abandoned.

(51) Int. Cl.
*H04J 1/16* (2006.01)
(52) U.S. Cl. .................. 370/252; 709/226; 709/229
(58) Field of Classification Search .............. 370/252, 370/395.4, 442; 709/223–226
See application file for complete search history.

(56) References Cited

U.S. PATENT DOCUMENTS

| | | | |
|---|---|---|---|
| 4,558,892 A | 12/1985 | Daw et al. | |
| 5,414,812 A | 5/1995 | Filip et al. | |
| 5,466,020 A | 11/1995 | Page et al. | |
| 5,821,937 A | 10/1998 | Tonelli et al. | |
| 5,889,956 A | 3/1999 | Hauser et al. | |
| 5,933,417 A * | 8/1999 | Rottoo ....................... 370/260 |
| 6,003,061 A | 12/1999 | Jones et al. | |
| 6,163,544 A | 12/2000 | Andersson et al. | |
| 6,272,544 B1 | 8/2001 | Mullen | |
| 6,289,488 B1 | 9/2001 | Dave et al. | |
| 6,336,138 B1 | 1/2002 | Caswell et al. | |
| 6,471,520 B1 | 10/2002 | Herman et al. | |

(Continued)

FOREIGN PATENT DOCUMENTS
WO 3062982 A1 7/2003

OTHER PUBLICATIONS

Johnson et al., "ISDN Deployment—Planning and Building a Corporate Network", IEEE Region 10 Conference on Computer and Communications Systems, pp. 851-852, Sep. 1990.

(Continued)

*Primary Examiner* — Ricky Ngo
*Assistant Examiner* — Kan Yuen
(74) *Attorney, Agent, or Firm* — Yee & Associates, P.C.; Jeffrey S. LaBaw

(57) ABSTRACT

A method, an apparatus, and computer instructions are provided for determining data center resource availability using multiple time domain segments. A reservation class is provided that includes a start time, duration and the number of units required. A scheduled resource class is provided with an availability and an available method. The availability method creates a set of segments for a list of reservations and iterates each segment to determine whether there are enough resources for the required units. The availability method then combines all adjacent reservations and removes reservations that are too short for the duration. The available method provides a way for user to determine if resources are available at and for a given time. A composite resource class is also provided for more than one scheduled resource with an availability and available method.

4 Claims, 16 Drawing Sheets

U.S. PATENT DOCUMENTS

| | | |
|---|---|---|
| 6,628,304 B2 | 9/2003 | Mitchell et al. |
| 6,986,135 B2 | 1/2006 | Leathers et al. |
| 7,007,980 B2 | 3/2006 | Otsuga et al. |
| 7,058,924 B2 | 6/2006 | Greenstein |
| 7,093,005 B2 | 8/2006 | Patterson |
| 7,097,804 B2 | 8/2006 | Frantz et al. |
| 7,209,870 B2 | 4/2007 | Simmons et al. |
| 7,228,326 B2 | 6/2007 | Srinivasan et al. |
| 7,478,361 B2 | 1/2009 | Peteanu et al. |
| 2002/0174227 A1 | 11/2002 | Hartsell et al. |
| 2002/0194045 A1 | 12/2002 | Shay et al. |
| 2003/0028656 A1 | 2/2003 | Babka |
| 2003/0034651 A1 | 2/2003 | Neubauer et al. |
| 2003/0051236 A1 | 3/2003 | Pace et al. |
| 2003/0084156 A1 | 5/2003 | Graupner et al. |
| 2003/0172145 A1 | 9/2003 | Nguyen |
| 2004/0006498 A1 | 1/2004 | Ohtake et al. |
| 2004/0010437 A1 | 1/2004 | Kiran et al. |
| 2004/0017783 A1 | 1/2004 | Szentesi et al. |
| 2004/0050487 A1 | 3/2004 | Frantz et al. |
| 2004/0059621 A1 | 3/2004 | Jameson |
| 2004/0073673 A1 | 4/2004 | Santos et al. |
| 2004/0083287 A1* | 4/2004 | Gao et al. .................. 709/226 |
| 2004/0128176 A1 | 7/2004 | Jordan et al. |
| 2004/0143954 A1 | 7/2004 | Walsh |
| 2004/0153533 A1 | 8/2004 | Lewis |
| 2004/0162749 A1 | 8/2004 | Vogel et al. |
| 2004/0205206 A1 | 10/2004 | Naik et al. |
| 2004/0225952 A1 | 11/2004 | Brown et al. |
| 2004/0267897 A1 | 12/2004 | Hill et al. |
| 2005/0027577 A1 | 2/2005 | Saeed |
| 2005/0027785 A1 | 2/2005 | Bozak et al. |
| 2005/0120715 A1 | 6/2005 | Labrador |
| 2006/0005162 A1 | 1/2006 | Tseng et al. |
| 2006/0041643 A1 | 2/2006 | Fanshier |
| 2006/0075399 A1 | 4/2006 | Loh et al. |
| 2006/0080413 A1 | 4/2006 | Oprea et al. |
| 2006/0235732 A1 | 10/2006 | Miller et al. |
| 2006/0271928 A1 | 11/2006 | Gao et al. |
| 2007/0219764 A1 | 9/2007 | Backe et al. |
| 2007/0236018 A1 | 10/2007 | Husmann et al. |

OTHER PUBLICATIONS

Ambler, "Planning for Deployment", Jul. 1, 2001 pp. 1-4, retrieved from http://www.ddj.com/architect/184414753?cid=Ambysoft on Apr. 15, 2008.

* cited by examiner

| RESERVATION | START TIME | UNITS |
|---|---|---|
| - | 0 | 0 |
| $A_S$ | 1 | +1 |
| $A_F$ | 6 | -1 |
| $B_S$ | 3 | +2 |
| $B_F$ | 7 | -2 |
| $C_S$ | 3 | +1 |
| $C_F$ | 5 | -1 |
| $D_S$ | 7 | +1 |
| $D_F$ | 11 | -1 |
| $E_S$ | 7 | +1 |
| $E_F$ | 10 | -1 |
| $F_S$ | 9 | +2 |
| $F_F$ | 10 | -2 |

*FIG. 6A*

| RESERVATION | START TIME | DELTA UNITS | BUSY | AVAILABLE (FROM 6) |
|---|---|---|---|---|
| - | 0 | 0 | 0 | 6 |
| $A_S$ | 1 | +1 | 1 | 5 |
| $B_S+C_S$ | 3 | 2+1=3 | 4 | 2 |
| $C_F$ | 5 | -1 | 3 | 3 |
| $A_F$ | 6 | -1 | 2 | 4 |
| $B_F+D_S+E_S$ | 7 | -2+1+1=0 | 2 | 4 |
| $F_S$ | 9 | +2 | 4 | 2 |
| $E_F+F_F$ | 10 | -1-2=-3 | 1 | 5 |
| $D_F$ | 11 | -1 | 0 | 6 |

FIG. 8A

```
public class ScheduledResource implements Resource
{
    // ordered by start time                                             /800
    private java.util.List reservations = new java.util.LinkedList();
    //the number of resources that are scheduled by this instance
    private int available;
    public static final long FOREVER = -1;
    // returns a list of availability as reservations, where each potential reservation is > = required duration
    // duration required is in milliseconds or can be FOREVER
    // startSearch - earliest start time
    // range - search range from start time, range can be FOREVER
    // note - you can test a reservation request against the result from an availability using the
    "available" method
    public java.util. List availability(        802
        int requiredUnits,
        long duration,
        long startSearch,
        long range)
    {
        java.util.List result = new java.util.LinkedList();
        // create a collection of segments - start/stop of reservations, and the units needed in each one
        java.util.List segments;
        synchronized (reservations)
        {
            segments = -getSegments(reservations); /804
        }
        // go through each segment, keeping track of resources that have been consumed (+'ve) or returned (-)
        // find all segments that have enough resources for this reservation (without checking time)
        int allocation = 0;
        for (java.util.ListIterator i = segments.listIterator(); i.hasNext();)
        {
            Segment current = (Segment) i.next();
            allocation + = current.units;
            if (range != FOREVER
                && duration != FOREVER
                && current.time > startSearch + range)
                break; // done searching
            //create a reservation entry the length of this segment
            if (allocation + requiredUnits <= available)         806
            {         808         810         812
                // start the segment no earlier than the startTime required
                long segmentStart =
                    startSearch > currenttime ? startSearch : currenttime;
                long segmentDuration;
                if (i.nextIndex() <: segments.size())
```

TO FIG. 8B

FROM FIG. 8A

```
{
    Segment next = = (Segment) segments.get(i.nextIndex());
    segmentDuration = next. time - segmentStart;
    // trim the segment if it stretches past the end of the search
    if (segmentStart + segmentDuration
        > startSearch + range + duration)
        segmentDuration =
            startSearch + range + duration - segmentStart;
}
else
    segmentDuration = FOREVER;
result.add(
    new Reservation(
        segmentStart,           814
        segmentDuration,
        required Units));
}
```

```
// combine all of the adjacent reservations
    for (java.util.ListIterator i=result.listIterator(); i.hasNext();)
    {
        Reservation current=(Reservation) i.next();
        if(li.hasNext())
            break; // done combining
        Reservation next = (Reservation) result.get(i.nextIndex());
        // combine these two
        if (current.endTime()==next.getStartTime())
        {
            Reservation newReservation;
            if (next.isForever())
                newReservation=
                    new Reservation(current.getStartTime(), requiredUnits);
            else
                newReservation=
                    new Reservation(
                        cu rrent.getStartTime(),
                        current.getDuration() + next.getDuration(),
                        requiredUnits);
            // get rid of the current element
            i.remove();
            // and the next, which have been combined
            i.next();
            i.set(newReservation);
            // now go back to check the next segment
            i.previous();
        }
        //else leave this segment as is
    }                                                                     ⎬816
    //now throw out any potential reservations that are too short
    for (java.util.ListIterator i = result.listIterator(); i.hasNext();)
    {
        Reservation current = (Reservation) i.next();
        if (current.isForever()
            || duration == FOREVER
            || current.getDuration() < duration)
            i.remove();  ~820
    }                                                                     ⎬818
    return result; ~822
}
```

FIG. 8D

```
private static class Segment
{                    ╭─ 832
        public int units; // number of units available in this segment
834 ╲ public long time; // start time of the segment
        public Segment(int units, long time)
        {
                this.units = units;
                this.time = time;
        }                ╭─ 836
        public boolean overlaps(Reservation r, boolean isLast)
        {
                if (isLast)
                        return time < r.endTime();
                else
                        return time >= r.getStartTime()
                                && (r.isForever() || time < r.endTime());
        }
}
private static class Segments extends java.util.LinkedList
{
        public void addSegment(Segment s)
        {
                // keep the segments in order
                for (java.util.Iterator i = this.iterator(); i.hasNext();)
                {
                        Segment c = (Segment) i.next();
          842 ╱// if segments are identical, combine them
                        if (c.time == s. time)
                        {
                                c.units += s.units;
                                return;
                        }
          844 ╱else // insert new segment ahead of later ones
                        if (c.time > s.time)
                        {
                                this.add(this.indexOf(c), s);
                                return;
                        }
                }
                // else it's the last segment, add it at the end
                this.add(s);
        }
}
```

Brace groupings: 830 (Segment class), 840 (addSegment method), 838 (Segments class).

```
public boolean available(Reservation r)
    {
        java.util.List availability=
            availability(
                r.getUnits(),
                r.getDuration(),
                r.getStartTime(),
                r.getDuration());
        return availability.size() != 0;
    }
```

FIG. 10A

```
public class CompositeResource implements Resource                        /1000
{
    private java.util.Map reservations = new java.util.HashMap();
    public List availability(
            int requiredUnits,
            long duration,
            long startSearch,
            long range)
    {
        java.util.List result = new java.util.LinkedList();
        synchronized (reservations)
        {
            java.util.List[] resourceAvailability =
                    new java.util.List[resources.length];
            // find availability of all resources that make up this composite
            for (int i = 0; i < resources.length; i++)
                resourceAvailability[i] =
                        resources[i].availability(
                                getUnitsForResource(null, requiredUnits),
                                duration,
                                startSearch,
                                range);
            // Now find the intersection of all resource availability
            // Start with the availability of the first resource
1006 ~   java.util.List currentIntersection =
                    new java.util.LinkedList(resourceAvailability[0]);
            // for each of the remaining resources, find the intersection with the current list
            for (int i = 1; i < resourceAvailability.length; i++)
            {
                if (currentIntersection.size() == 0)
                        break;
                // wer're done looking, there are no overlapping periods available
                java.util.List newIntersection = new java.util.LinkedList();
                // intersect each current reservation against the resource
                for (java.util.Iterator ri = currentIntersection.iterator();
                        ri.hasNext();
                        )
                {
                        Reservation r = (Reservation) ri.next();
                        newIntersection.addAll(
1010 ~                          _overlaps(r, resourceAvailability[i], requiredUnits));
                }
                // use the trimmed reservations to check the next resource
                currentIntersection = newIntersection;
            }
1012 ~   return currentIntersection;
        }
    }
```

```
// find the intersection of the given reservation with
    // the list of availability
    // returns null if no overlap found
    private java.util.List _overlaps(
        Reservation r,
        java.util.List availability,
        int useUnits)
    {
        java.util.List result = new java.util.ArrayList();
        long startTime = r.getStartTime();
        long duration = r.getDuration();
        for (java.util.Iterator i = availability.iterator(); i.hasNext();)
        {
            Reservation resourceReservation = (Reservation) i.next();
            // see if this reservation overlaps the one we're checking
            Reservation overlap = r.overlap(resourceReservation, useUnits);
            if(overlap != null)
                result.add(overlap);
        }
        return result;
    }                                                                          ⎬1020 public boolean available(Reservation r)
    {
        java.util.List availability =
            availability(
                r.getUnits(),
                r.getDuration(),
                r.getStartTime(),
                r.getDuration());
        return availability.size() != 0;
    }                                                                          ⎬1022
```

METHOD AND APPARATUS FOR DETERMINING DATA CENTER RESOURCE AVAILABILITY USING MULTIPLE TIME DOMAIN SEGMENTS

CROSS-REFERENCE TO RELATED APPLICATION

This application is related to commonly assigned and U.S. patent application Ser. No. 11/121,421 entitled "Method and Apparatus for a Design Pattern for Automating Service Provisioning".

This application is a continuation of application Ser. No. 11/121,533, filed May 4, 2005, status allowed.

BACKGROUND OF THE INVENTION

1. Technical Field

The present invention relates to an improved data processing system. In particular, the present invention relates to managing availability of resources in a data center. Still more particular, the present invention relates to determining data center resource availability using multiple time domain segments.

2. Description of Related Art

In a data center, automatic provisioning of resources requires systems or users to understand the availability of the resources. However, since these resources are mostly assigned from pools, it may be difficult to determine their availability. For example, when a user wants to schedule resources, the user has to first determine the number of resources needed, the type of resources needed, the time period or duration for which the resources are needed, and the start time of the needed resource. Once the user gathers these requirements, the user has to determine based on the availability of resources from the pool whether the requirements may be satisfied.

Currently, the user has to have knowledge of the availability of the resources in the pool in order to make that decision. Alternatively, the user has to perform complex algorithms to determine resource availability. No existing mechanism is present that simply and automatically manages and reports availability of resources from a pool. Therefore, it would be advantageous to have an improved method for determining resource availability in a data center, such that a list of potential time periods satisfying a given duration and resource can be generated for presentation in a management user interface to the user.

SUMMARY OF THE INVENTION

The present invention provides a method, an apparatus, and computer instructions in a data processing system for determining data center resources availability. Responsive to a query for a list of resource availabilities, the present invention creates a set of segments for a list of reservations. The query includes a number of required resources, a start time, and a duration. The present invention then determines, for each segment in the set, if resources are available based on a number of required resources. If resources are available, the present invention combines adjacent reservations and removes from the list of resource availabilities reservations having shorter durations than duration of the query, and returns the list of resource availabilities.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6A is a diagram illustrating a list of segments created for each reservation in list of reservations 500 in FIG. 5 in accordance with an illustrative embodiment of the present invention;

FIG. 8A is a diagram illustrating an exemplary implementation of the scheduled resource class in accordance with an illustrative embodiment of the present invention;

FIG. 8B is a diagram illustrating an exemplary implementation of the scheduled resource class in continuation of FIG. 8A in accordance with an illustrative embodiment of the present invention;

FIG. 8C is a diagram illustrating an exemplary implementation of the scheduled resource class in continuation of FIG. 8B in accordance with an illustrative embodiment of the present invention;

FIG. 8D is a diagram illustrating exemplary segment and segments class in accordance with an illustrative embodiment of the present invention;

FIG. 8E is a diagram illustrating an exemplary implementation of the scheduled resource class in continuation of FIG. 8C in accordance with an illustrative embodiment of the present invention;

FIG. 10A is a diagram illustrating an exemplary composite resource class in accordance with an illustrative embodiment of the present invention;

FIG. 10B is a diagram illustrating an exemplary composite resource class in continuation of FIG. 10A in accordance with an illustrative embodiment of the present invention.

DETAILED DESCRIPTION OF THE PREFERRED EMBODIMENT

Figure 1:
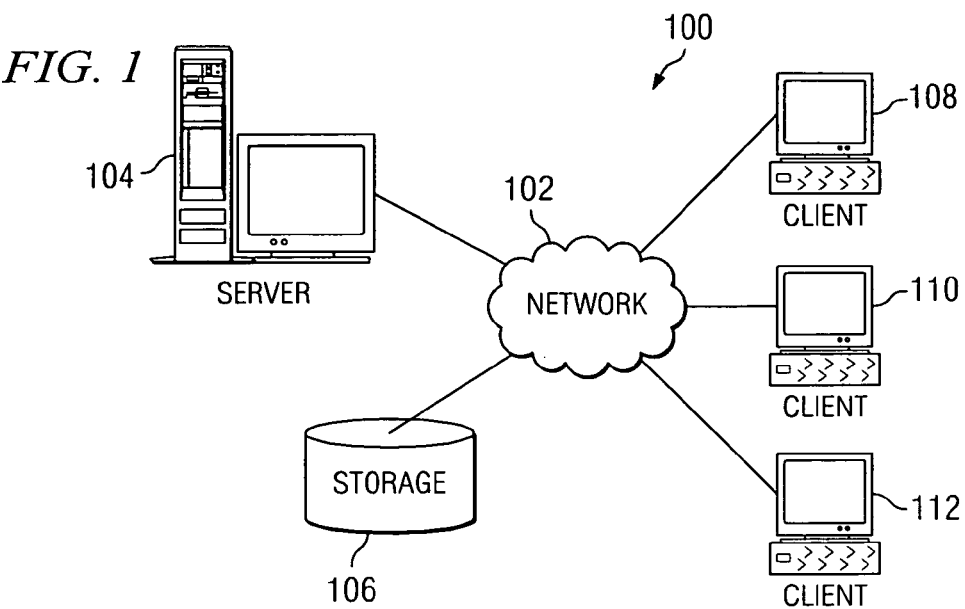
FIG. 1 depicts a pictorial representation of a network of data processing systems in which the present invention may be implemented.

With reference now to the figures, FIG. 1 depicts a pictorial representation of a network of data processing systems in which the present invention may be implemented.

Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
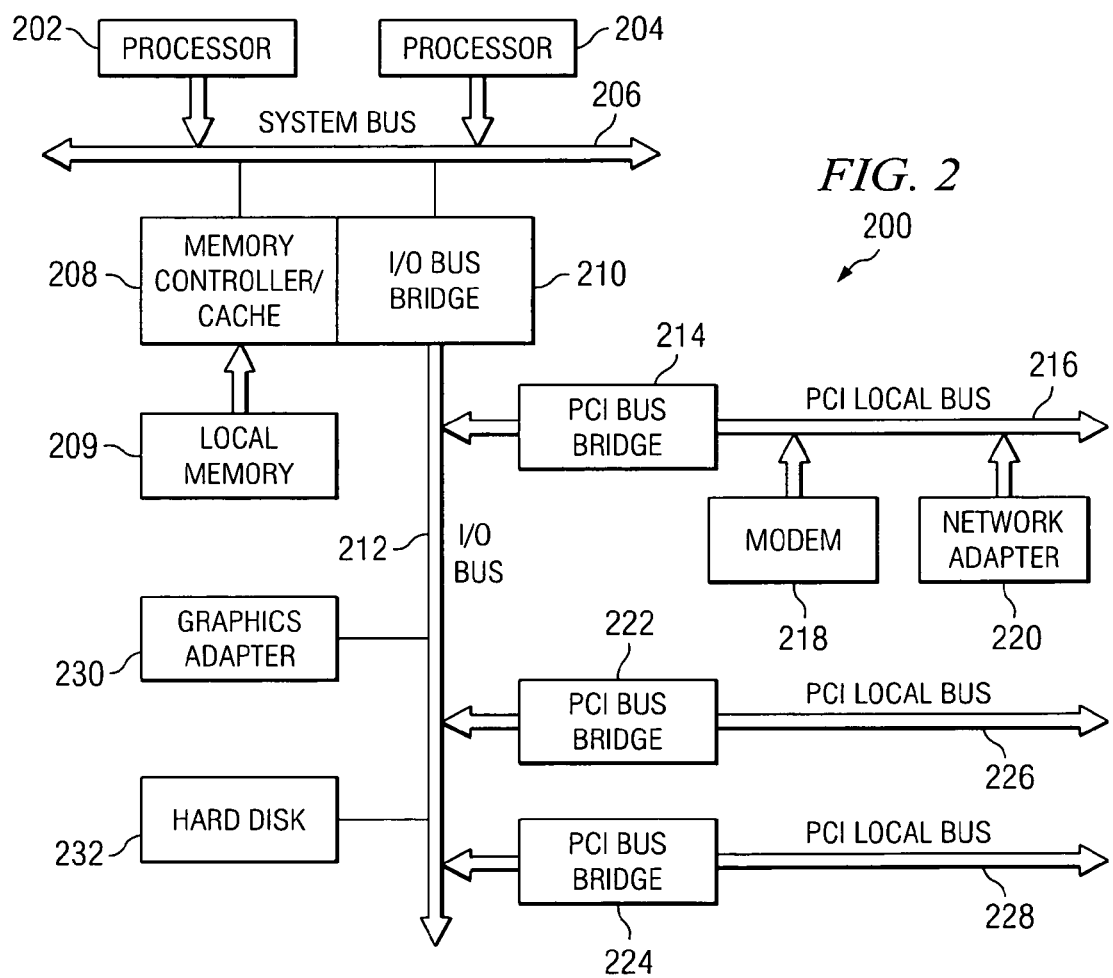
FIG. 2 is a block diagram of a data processing system that may be implemented as a server, in accordance with an illustrative embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
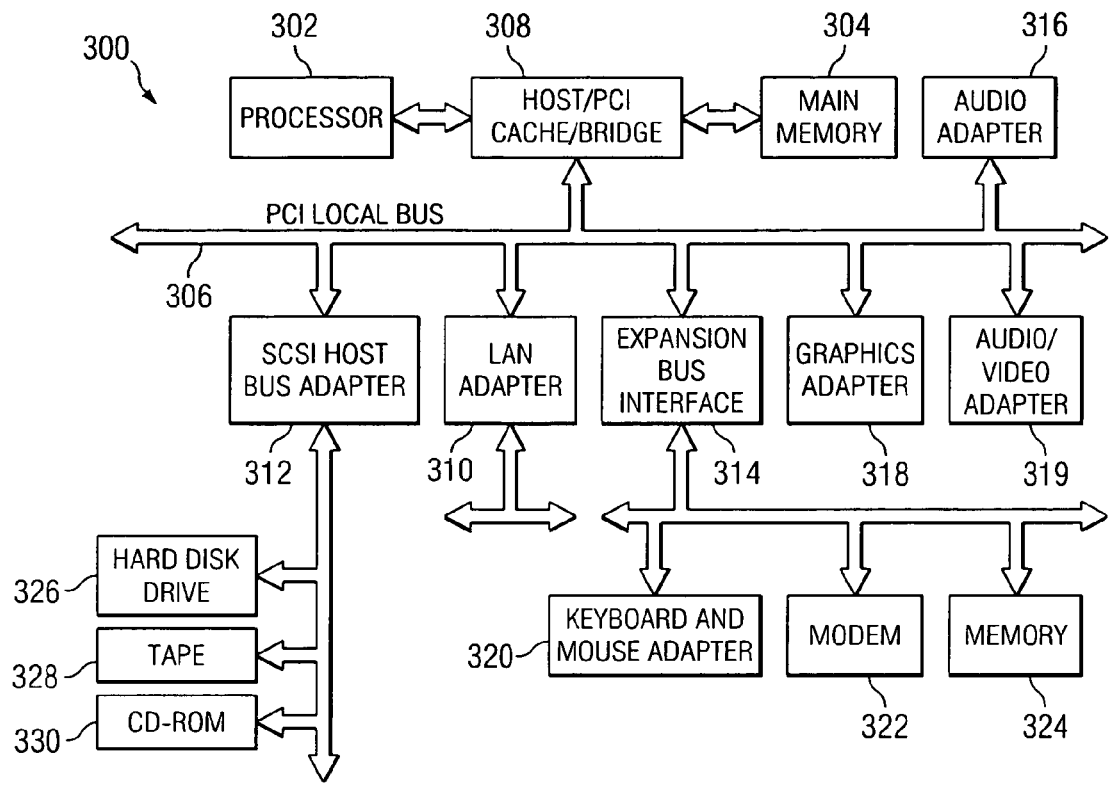
FIG. 3 is a block diagram of a data processing system in which an illustrative embodiment of the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
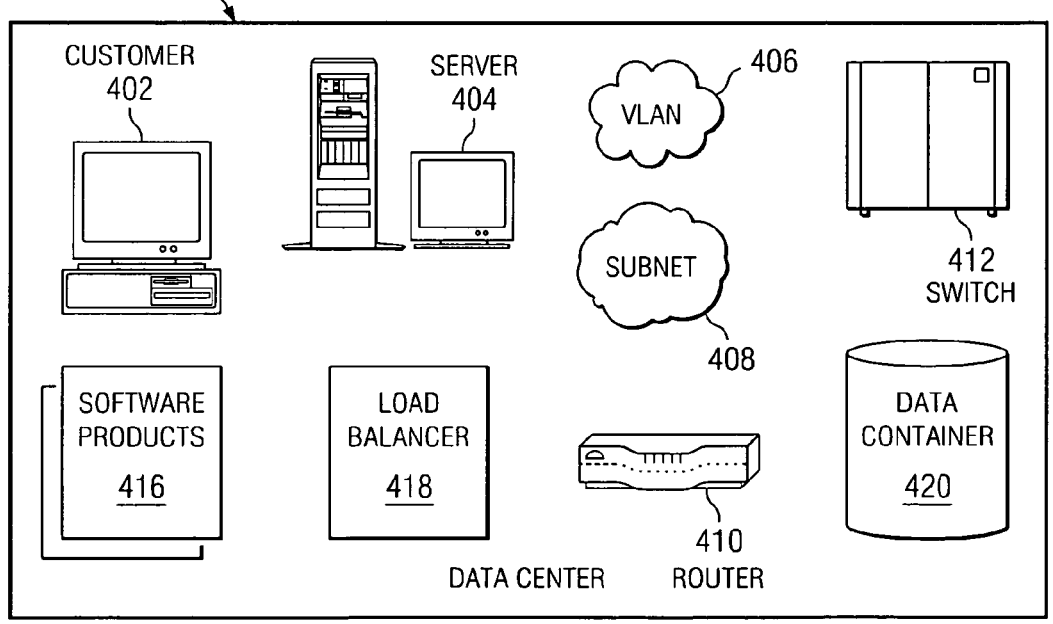
FIG. 4 is a diagram illustrating an exemplary data center, in accordance with an illustrative embodiment of the present invention.

Turning now to FIG. 4, a diagram illustrating an exemplary data center is depicted, in accordance with a preferred embodiment of the present invention. As shown in FIG. 4, in this illustrative example, data center 400 includes resources, such as, customer 402, server 404, Virtual Local Area Network (VLAN) 406, subnet 408, router 410, switch 412, software products 416, load balancer 418, and data container 420.

Customer 402 may be, for example, a client or an administrator who uses a data processing system, such as data processing system 300 in FIG. 3. Server 404 may be implemented as a data processing system, such as data processing system 200 in FIG. 2. Server 404 may also be implemented as an application server, which hosts Web services, or other types of servers. Router 410 and switch 412 facilitate communications between different devices. VLAN 406 is a network of computers that behave as if they are connected to the same wire even though they may actually be physically located on different segments of a local area network. Subnet 408 is a portion of a network, which may be a physically independent network segment and shares a network address with other portions of the network.

Software products 416 are applications that may be deployed to a client or a server. Load balancer 418 spreads traffic among multiple systems such that no single system is overwhelmed. Load balancer 418 is normally implemented as software running on a data processing system. Data container 420 may be a database, such as DB2 Universal Database, a product available from International Business Machines Corporation.

Data center 400, as depicted in FIG. 4, is presented for purposes of illustrating the present invention. Other resources, such as, for example, cluster of servers and switch port, also may be included in data center 400. The mechanism of the present invention manages availability of resources, including, but not limited to customer 402, server 404, Virtual Local Area Network (VLAN) 406, subnet 408, router 410, switch 412, software products 416, load balancer 418, and data container 420.

The present invention provides a method, an apparatus, and computer instructions for determining data center resource availability. The processes of the present invention are performed by a processing unit that comprises one or more processors, such as processor 302 in FIG. 3, using computer implemented instructions, which may be located in a memory such as, for example, main memory 304, memory 324, or in one or more peripheral devices 326 and 330 in FIG. 3.

In an illustrative embodiment, the present invention introduces three classes: a scheduled resource class, a composite resource class and a reservation class for a management resource. The scheduled resource class uses an integer value, known as "available", to represent the number of resources that are available for a given resource type, for example, the number of available identical servers in a pool. In addition, the scheduled resource class includes a list of "reservations" that have been made against the pool. A pool may includes a variety of resources including servers, routers, switches, etc.

The composite resource class represents a set of diverse resources that combine to make up a complex data center resource. The composite resource class contains an array of the scheduled resources objects representing the resources used in the composite resource.

On the other hand, the reservation class represents a single time slot allocated for a scheduled resource. The reservation class uses an integer, known as "units", to represent the number of units reserved for the time slot, for example, the number of processors reserved. In addition, the reservation class includes a start time and duration of the reservation, for example, starting Friday for duration of five days.

In an illustrative embodiment, the present invention provides a process that allows a user to query for a list of availabilities of a given resource and to verify that a given reservation can be honored. Within the scheduled resource class, the present invention introduces two methods, an "availability" method that examines a list of reservations that have been made against the pool and an "available" method that checks if the resources are available at a given time of a reservation.

The "availability" method first creates a set of segments, which are calendar time periods for which the available resources are constant, from the list of reservations already made. The method creates a new segment when the number of resources available changes, that is when a reservation starts or completes. Next, for each segment in the set, the method determines if the number of resources available satisfies the request. The determination is made based on the number of units currently allocated, the number of units required, and the number of units available. If the number of resources available satisfies the request, the method creates a new reservation entry for the duration of the segment and adds the reservation to a list of reservations.

After a list of reservations is created, the method iterates the list and combines all adjacent segments. Subsequently, for each reservation in the list, the method checks the duration of the reservation to determine if it is shorter than the required duration. If so, the method removes the reservation from the list. Removing the reservation ensures that the reservation meets the duration requirement. Once reservations that failed the duration requirement are removed, the method returns the list of reservations that can meet the request.

As described above, the present invention also provides an "available" method that checks if the resources are available at a given time of a reservation. The "available" method calls the "availability" method with parameter values that match the length of the "available" request. If a match can be found, sufficient resources are available to meet the request.

Figure 5:
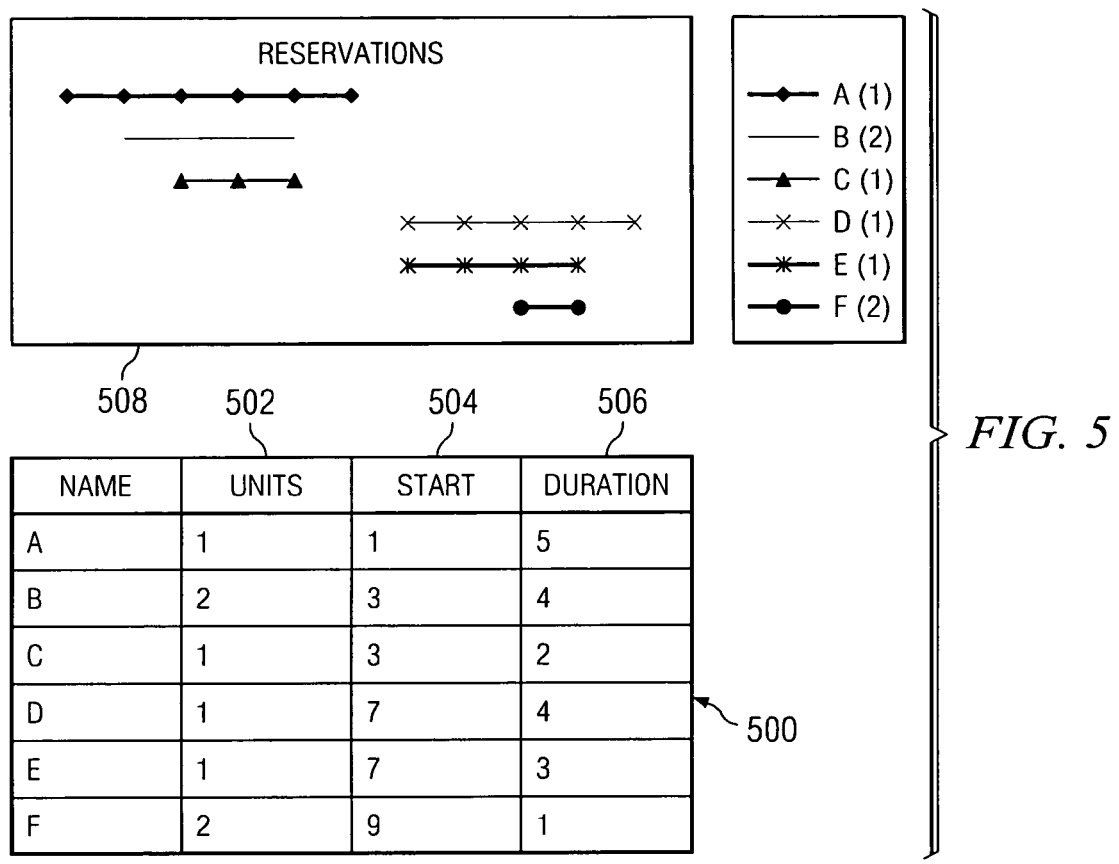
FIG. 5 is a diagram illustrating an exemplary list of reservations in accordance with an illustrative embodiment of the present invention.

Turning now to FIG. 5, a diagram illustrating an exemplary list of reservations associated with scheduled resources is depicted in accordance with an illustrative embodiment of the present invention. As shown in FIG. 5, list of reservations 500 includes number of units 502, start time 504, and duration 506 for each scheduled resource from A to F. Number of units 502 indicates the number of resources reserved, for example, 20 processors. Start time 504 indicates the time when the reservation begins, for example, on Monday. Duration 506 indicates the length of the reservation, for example, for 5 days.

In this example, there are 6 scheduled resources in list of reservations 500: scheduled resources A, B, C, D, E, and F. Scheduled resource A is reserved for 1 unit starting at time slot 1 for 5 slots of time duration. Scheduled resource B is reserved for 2 units starting at time slot 3 for 4 slots of time duration. Scheduled resource C is reserved for 1 unit starting at time slot 3 for 2 slots of time duration. Scheduled resource D is reserved for 1 unit starting at time slot 7 for 4 slots of time duration. Scheduled resource E is reserved for 1 unit starting at time slot 7 for 3 slots of time duration. Scheduled resource F is reserved for 2 units starting at time slot 9 for 1 slot of time duration.

Also illustrated in this example is reservation chart 508, which shows the duration of scheduled resources A to F in terms of the number of time slots each scheduled resource is reserved for.

Turning now to FIG. 6A, a diagram illustrating a list of segments created for each reservation in list of reservations 500 in FIG. 5 is depicted in accordance with an illustrative embodiment of the present invention. As shown in FIG. 6A, placeholder segment 600 is created at 0 time slot. For each reservation from A to F, two segments are created. One segment is created at the start of reservation for additional resources that are reserved and one segment is created at the end of the reservation for resources that are released.

In this example, segment As 602 is created at start of reservation for scheduled resource A, which starts at time slot 1 for additional 1 unit of resource. Segment Af 604 is created at the end of reservation for scheduled resource A, which ends at time slot 6 for 1 unit of resource that is released. Similarly, segment Bs 606 is created at start of reservation for scheduled resource B, which starts at time slot 3 for additional 2 units of resource. Segment Bf 608 is created at the end of reservation for scheduled resource B, which ends at time slot 7 for 2 units or resource that are released. With the list of segments created in this Figure, the start time and the number of units consumed and released for each reservation is easily identified.

Figures 6B, 7A:
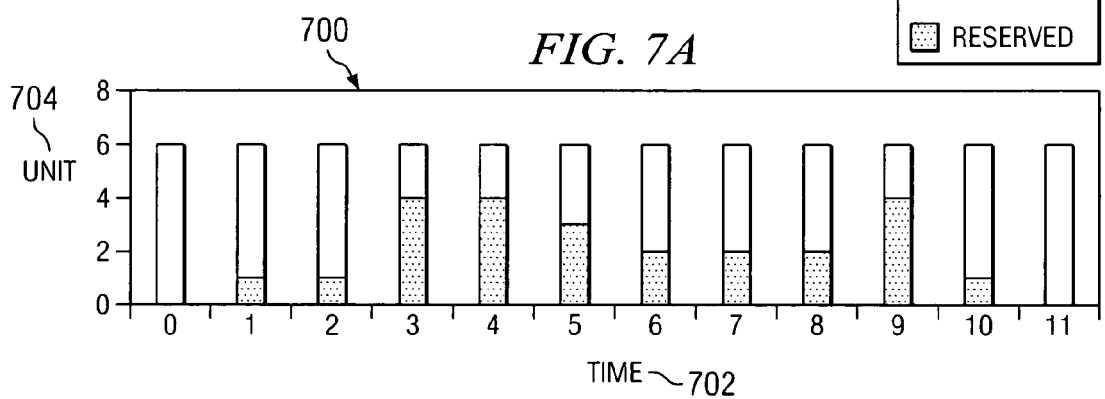
FIG. 6B is a diagram illustrating a list of combined segments that are sorted based on start time in accordance with an illustrative embodiment of the present invention.
FIG. 7A is a diagram illustrating current resource allocation based on the list of segments in FIG. 6B in accordance with an illustrative embodiment of the present invention.

Turning now to FIG. 6B, a diagram illustrating a list of combined segments that are sorted based on start time is depicted in accordance with an illustrative embodiment of the present invention. As shown in FIG. 6B, segments in FIG. 6A that have the same start time 620 are collected. The units of resources consumed and released are summed together to give a number of delta units 622. Delta units 622 indicate the change in units of resource for each new start time.

In this example, segment Bs 606 and Cs 610 in FIG. 6A has the same start time at time slot 3. Therefore, the units of resources consumed and released are summed together (2+1), which gives 3 delta units. This means that at time slot 3, a total of 3 additional units are needed. Similarly, segments Bf 608, Ds 612, and Es 614 in FIG. 6A has the same start time at time slot 7. The units of resources consumed and released are summed together (−2+1+1) to give 0 delta unit. This means no change of units at time slot 7. Also, segments Ef 616 and Ff 618 in FIG. 6A has the same start time at time slot 10. The units of resource consumed and released are summed together (−1+−2) to give −3 delta units. This means that 3 units of resources are released at time slot 10.

In addition to calculating delta units 622, for each new start time, a busy 624 and a number of available resources 626 is calculated based on the calculated delta units 622. For example, at time slot 1, a busy of 1 is calculated based on 1 additional delta unit calculated and 5 units of resource is available as a result. Similarly, at time slot 3, a busy of 4 is calculated based on 3 additional delta units calculated and 2 units of resource are available as a result. Finally, once all delta units 622 are calculated, the list of segments is sorted by start time 620.

Turning now to FIG. 7A, a diagram illustrating current resource allocation based on the list of segments in FIG. 6B is depicted in accordance with an illustrative embodiment of the present invention. As shown in FIG. 7A, current resource allocation 700 includes a time axis 702 represent the time slots, starting from 0 to 11; and units axis 704 representing the number of units of resource, starting from 0 to 8.

According to busy 624 and available 626 in FIG. 6B in the previous example, at time slot 1, 1 unit of resource is busy while 5 units of resource are available. At time slot 3, 4 units of resource are busy, while 2 units of resource are available. At time slot 7, 2 units of resource are busy while 4 units of resource are available. At time slot 10, only 1 unit is busy and 5 units are available.

Figure 7B:
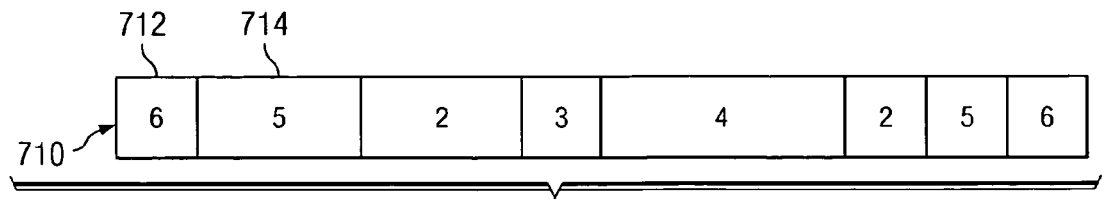
FIG. 7B is a diagram illustrating an exemplary set of segments built based on current resource allocation 700 in FIG. 7A in accordance with an illustrating embodiment of the present invention.

Turning now to FIG. 7B, a diagram illustrating an exemplary set of segments built based on current resource allocation 700 in FIG. 7A is depicted in accordance with an illustrating embodiment of the present invention.

As shown in FIG. 7B, when the "availability" method is called, the method examines current resource allocation 700 in FIG. 7A and builds a set of segments with each segment representing a change of resource availability. In this example, segment set 710 includes 8 segments, with each segment representing resource availability of time slots that have the same number of resource available. For example, segment 712 has 6 units of resource available, while segment 714 has 5 units of resource available and so on. Once segment set 710 is built, the "availability" method determines for each segment in the set, if the number of resources available satisfies a new reservation request. The determination is based on the number of units currently allocated, the number of units required, and the number of units available.

Figure 7C:
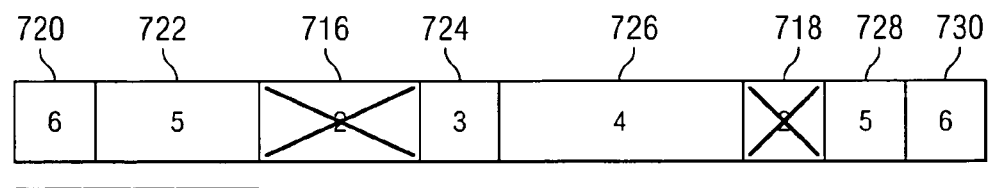
FIG. 7C is a diagram illustrating segment set in FIG. 7B after determination of resource availability in accordance with an illustrative embodiment of the present invention.

Turning now to FIG. 7C, a diagram illustrating segment set 710 in FIG. 7B after determination of resource availability is depicted in accordance with an illustrative embodiment of the present invention. As shown in FIG. 7C, the "availability" method iterates each segment in segment set 710 in FIG. 7B to determine whether the resource availability of each segment satisfies the new reservation request. This determination includes comparing the number of units allocated plus the number of units required against the number of units available.

In this example, the new reservation requires 3 units of resource. Since segments 716 and 718 each only has 2 units of resource available, segments 716 and 718 are eliminated. After overbooked segments are eliminated, the method creates a new reservation entry for the duration of the segment. The "availability" method then combines adjacent segments into a single reservation and reports time slots that can accommodate the new reservation request.

Figure 7D:
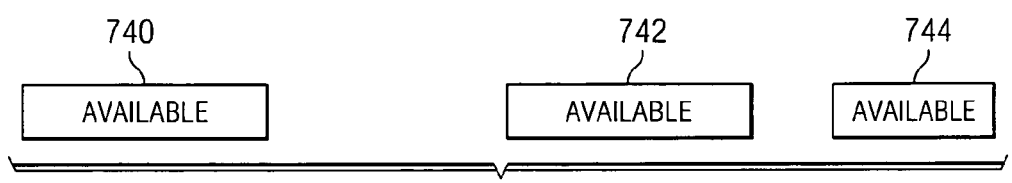
FIG. 7D is a diagram illustrating a diagram illustrating combined reservations is depicted in accordance with an illustrative embodiment of the present invention.

Turning now to FIG. 7D, a diagram illustrating combined reservations is depicted in accordance with an illustrative embodiment of the present invention. As depicted in FIG. 7D, adjacent segments 720 and 722, in FIG. 7C are combined to form segment 740. Similarly, adjacent segments 724 and 726 in FIG. 7C are combined to form reservation 742. Finally, adjacent segments 728 and 730 are combined to form reservation 744.

Figure 7E:
FIG. 7E is a diagram illustrating a remaining reservation in accordance with an illustrative embodiment of the present invention.

After segments are combined, the "availability" method checks the duration of each reservation in the reservation list to determine if it is shorter than the required duration of the new reservation request. If so, the method removes the reservation from the list and the list of remaining reservations are returned. Turning now to FIG. 7E, a diagram illustrating a remaining reservation is depicted in accordance with an illustrative embodiment of the present invention. As shown in FIG. 7E, in this example, since the required duration is 3 time slots and reservation 744 only lasts 2 time slots, the "availability" method removes reservation 744 and only reservations 740 and 742 remain.

Turning now to FIG. 8A, a diagram illustrating an exemplary implementation of the scheduled resource class is depicted in accordance with an illustrative embodiment of the present invention. As shown in FIG. 8A, scheduled resource class 800 includes availability method 802. When invoked, availability method 802 first creates a set of segments from a list of reservations 804. The set of segments are similar to segment set 710 in FIG. 7B. More detail regarding segments is discussed in FIG. 8D.

Availability method 802 then iterates each segment in the set and determines if the number of resources available satisfies the request 806. The determination is based on the number of units allocated 808, the number of units required 810, and the number of units available 812. This elimination of overbooking is illustrated in FIG. 7C.

Turning now to FIG. 8B, a diagram illustrating an exemplary implementation of the scheduled resource class in continuation of FIG. 8A is depicted in accordance with an illustrative embodiment of the present invention. As shown in FIG. 8B, if the number of resources available satisfies the request, availability method 802 creates new reservation entry 814 for the time duration of the segment.

Turning now to FIG. 8C, a diagram illustrating an exemplary implementation of the scheduled resource class in continuation of FIG. 8B is depicted in accordance with an illustrative embodiment of the present invention. As shown in FIG. 8C, after new reservation entries are created, availability method 802 combines all the adjacent reservations 816. The combined entries are illustrated in FIG. 7D. Finally, availability method 802 checks each reservation entry and determines if the duration of the reservation is shorter than the required duration 818. If so, availability method removes the entry from the list of reservations 820. The list of remaining reservations, similar to reservation entry 740 and 742 in FIG. 7E, is then returned 822.

Turning now to FIG. 8D, a diagram illustrating exemplary segment and segments class is depicted in accordance with an illustrative embodiment of the present invention. As shown in FIG. 8D, in this example implementation, segment class 830 is a part of scheduled resource class 802 in FIG. 8A. Segment class 830 includes an integer value of units 832, which indicates the number of units available in a segment. Segment class 834 also includes time 834, which indicates the start time of a segment. Furthermore, segment class 834 includes overlaps method 836 that determines if the segment overlaps with a reservation.

Also in this example implementation, segments class 838 represent a set of segments. Segments class 838 includes addSegment method 840, which combines segments if their start times are identical 842 or add a segment ahead of another if their start times are not identical 844.

Turning now to FIG. 8E, a diagram illustrating an exemplary implementation of the scheduled resource class in continuation of FIG. 8C is depicted in accordance with an illustrative embodiment of the present invention. As shown in FIG. 8E, in addition to availability method 802, scheduled resource class 800 also includes available method 850. Available method 850 merely calls the availability method 802 in FIG. 8A to return true if parameter values match the length of the "available" request. A true means that sufficient resources are available to meet the request.

Figure 9:
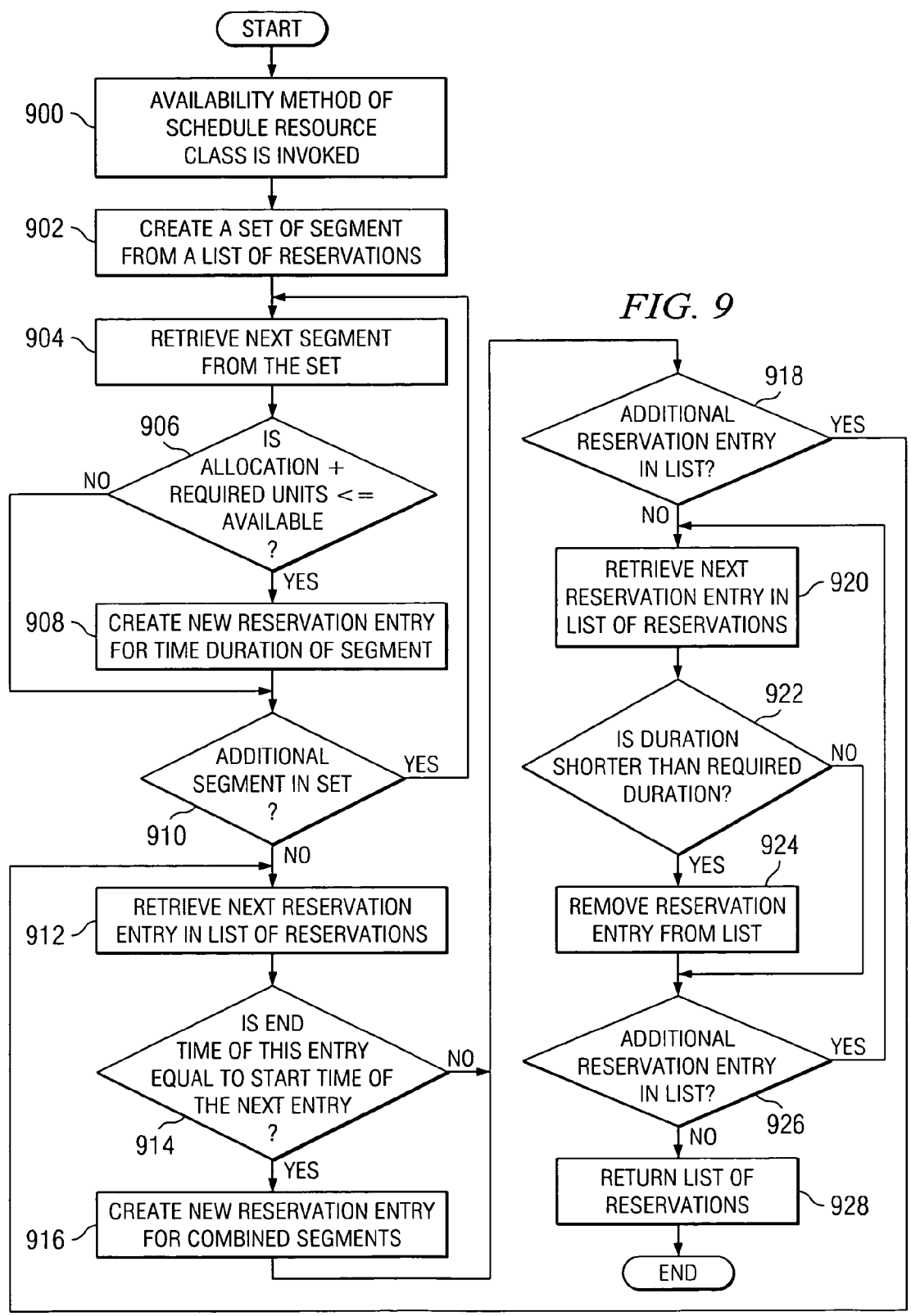
FIG. 9 is a flowchart of an exemplary process for determining availability of resources using multiple time segments in accordance with an illustrative embodiment of the present invention.

Turning now to FIG. 9, a flowchart of an exemplary process for determining availability of resources using multiple time segments is depicted in accordance with an illustrative embodiment of the present invention. As shown in FIG. 9, the process begins when the availability method of the scheduled resource class is invoked (step 900). Next, the method creates a set of segments from the list of reservations (step 902).

The availability method then retrieves the next segment from the set of segments (step 904) and makes a determination as to whether the number of units allocated plus the number of units required is less than or equal to the number of units available (step 906). If so, the method creates a new reservation entry for the time duration of the segment (step 908) and continues to step 910. Otherwise, the process continues to step 910. At step 910, the method determines if additional segment is present in the set (step 910). If additional segment is present, the process returns to step 904 to retrieve the next segment. Otherwise, the method retrieves the next reservation entry from the list of reservation entries created in step 908 (step 912).

The method then makes a determination as to whether the end time of this entry is equal to the start time of the next entry, meaning that they are adjacent entries (step 914). If they are equal, the method creates a new reservation entry for the combined segments (step 916) and continues to step 918. Otherwise, the process continues to step 918. As step 918, the method makes a determination as to whether additional reservation entry is present in the list (step 918). If so, the process returns to step 912 to retrieve the next reservation entry. Otherwise, the method retrieves the next reservation entry from the list of reservations combined created in step 916 (step 920) and makes a determination as to whether the duration of this reservation entry is shorter than the required duration (step 922). If so, the method removes the reservation entry from the list (step 924) and continues to step 926). Otherwise, the process continues to step 926.

At step 926, the method makes a determination as to whether additional reservation entry is present in the list (step 926). If so, the process returns to step 920 to retrieve the next reservation entry. Otherwise, the method returns the list of reservations (step 928) and the process terminates thereafter.

In addition to a single scheduled resource, multiple managed resource availabilities may be determined using a composite resource class provided by the present invention. Similar to the scheduled resource class, the composite resource class includes an "availability" method and an "available" method. The "availability" method first retrieves a list of resource availabilities from current reservations and all the resources that make up the composite resource. This is performed by invoking the individual "availability" method of each resource.

Once the list of resource availabilities is retrieved, the method first retrieves the first resource availability from the list as a current intersection candidate. For each of the remaining resource availabilities in the list, the method then invokes an intersection method to determine if an intersection exists. An intersection exists where the current intersection candidate overlaps with the remaining resource availabilities in the list. This overlap is determined by invoking an overlap method on each current intersection candidate.

Turning now to FIG. 10A, a diagram illustrating an exemplary composite resource class is depicted in accordance with an illustrative embodiment of the present invention. As shown in FIG. 10A, composite resource class 1000 may represent a resource type or a pool. Composite resource class 1000 includes availability method 1002, which retrieves a list of availabilities from current reservations and list of resources that make up the composite 1004.

Next, the method retrieves the first resource availability from the list as a current intersection candidate 1006. For each of the remaining resource availabilities in the list, availability method 1002 determines whether an intersection exists. This determination is made by invoking an intersection method 1008, which iterates each current intersection in the current intersection candidate to determine whether it overlaps with each resource availability in the list 1010. The overlaps method is described in further detail in FIG. 10B. If so, a list of intersections is returned to the intersection method for each candidate and a list of intersections is returned to the availability method for all current candidates. Thus, a list of current intersections is returned as a result 1012.

Turning now to FIG. 10B, a diagram illustrating an exemplary composite resource class in continuation of FIG. 10A is depicted in accordance with an illustrative embodiment of the present invention. As shown in FIG. 10B, overlaps method 1020 determines if an overlap exists between each current intersection and each resource availability in the list. Overlaps method 1020 returns a list of overlaps.

Similar to the scheduled resource class, composite resource class 1000 also includes available method 1022. However, similar to available method 850 in FIG. 8D in that available method 1022 merely invokes availability method 1002 in FIG. 10A to return true if parameter values match the length of the "available" request. A true means that sufficient resources are available to meet the request.

Figure 11A:
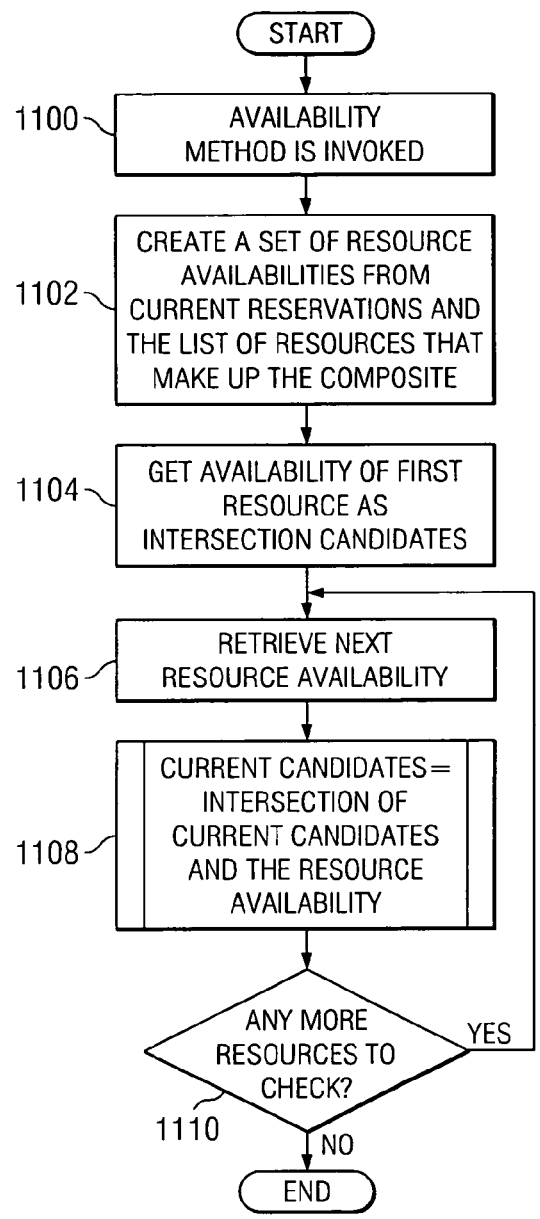
FIG. 11A is a flowchart of an exemplary process for determining resource availability of a composite resource in accordance with an illustrative embodiment of the present invention.

Turning now to FIG. 11A, a flowchart of an exemplary process for determining resource availability of a composite resource is depicted in accordance with an illustrative embodiment of the present invention. As shown in FIG. 11A, the process begins when the availability method is invoked in the composite resource class (step 1100). Next, the method creates a set of resource availabilities from current reservations and the list of resources that make up the composite (step 1102).

The method then retrieves the first resource availability from the set of resource availabilities created as the current intersection candidate (step 1104) and retrieves the next resource in the resource availability (step 1106). The method then identifies a list of current intersections which indicates intersections of current candidates and resource availability. This step is performed by invoking the intersection method (step 1108). More detail regarding the intersection method is discussed in FIG. 11B. Once the list of current intersections is identified, the method makes a determination as to whether additional resource is present in the resource availability (step 1110). If so, the process returns to step 1106 to retrieve the next resource from the resource availability. Otherwise, the process terminates thereafter.

Figure 11B:
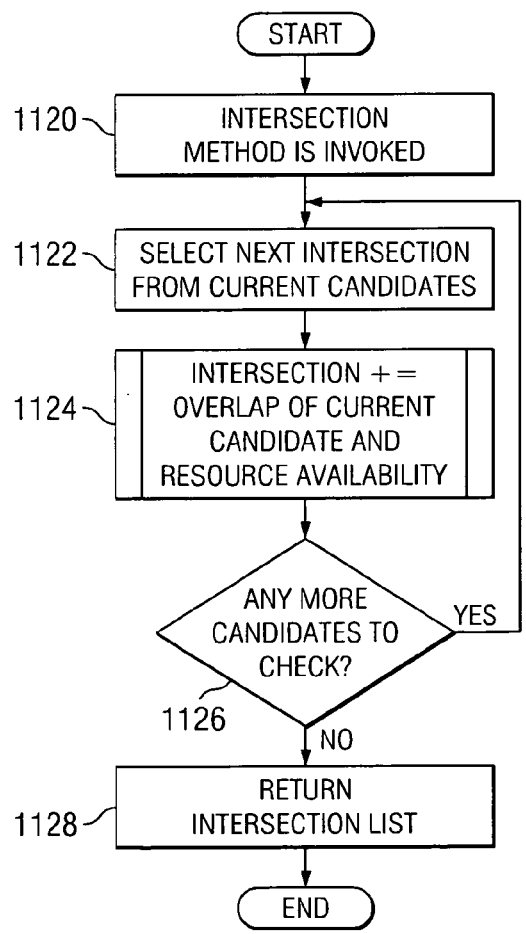
FIG. 11B is a flowchart of an exemplary process for an intersection method for identifying a list of intersections in accordance with an illustrative embodiment of the present invention.
Figure 11C:
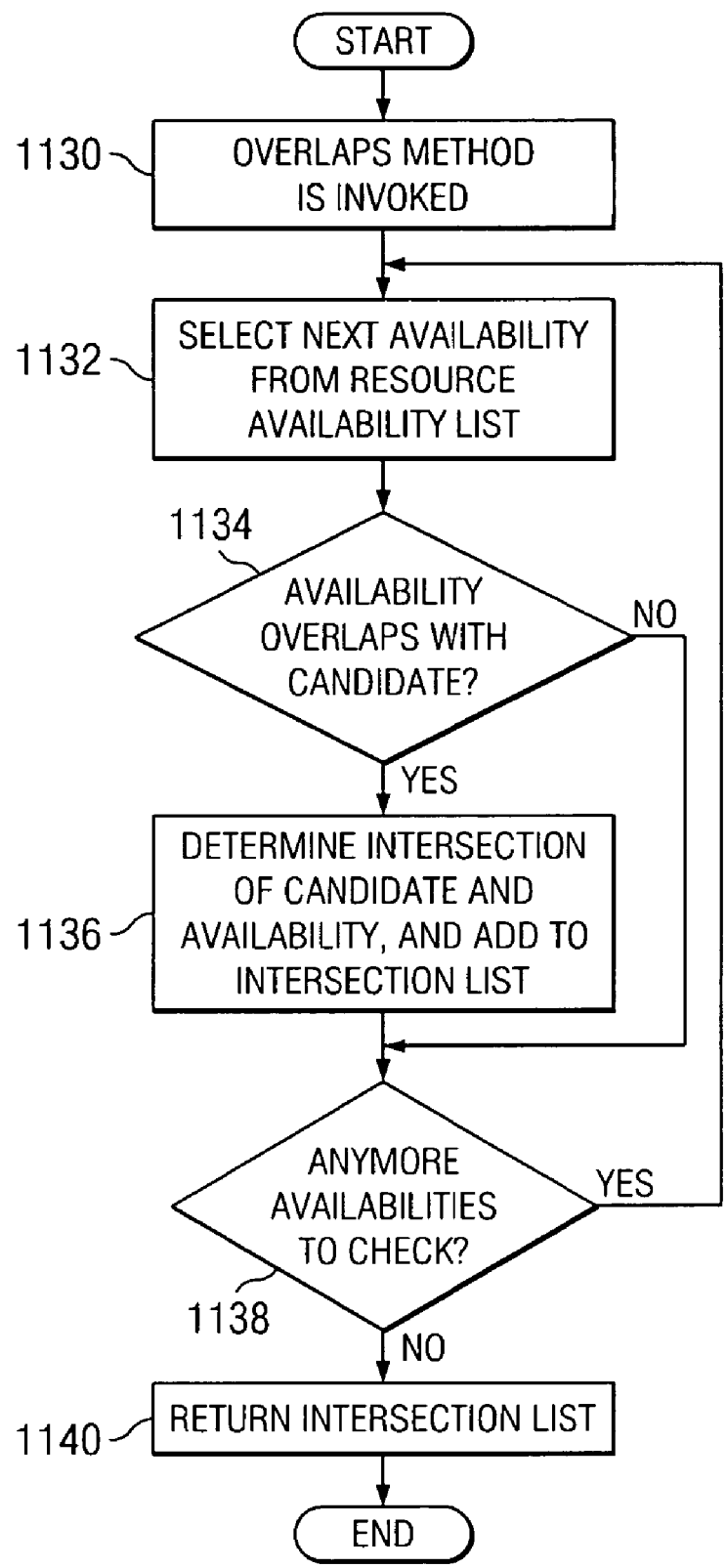
FIG. 11C is a flowchart of an exemplary process for an overlaps method for identifying a list of intersections where current intersection candidate overlaps with resource availability in accordance with an illustrative embodiment of the present invention.

Turning now to FIG. 11B, a flowchart of an exemplary process for an intersection method for identifying a list of intersections is depicted in accordance with an illustrative embodiment of the present invention. As depicted in FIG. 11B, the process begins when the intersection method is invoked (step 1120). Next, the intersection method selects the next intersection from the current intersection candidate (step 1122) and identifies a list of intersections where current intersection candidate overlaps with resource availability (step 1124). This step is performed by invoking an overlaps method. More details regarding the overlaps method is discussed in FIG. 1C. Once a list of intersections is identified, the intersection method makes a determination as to whether additional intersection candidates are present (step 1126). If additional intersection candidates are present, the process returns to step 1122 to select the next intersection candidate. Otherwise, the intersection list is returned (step 1128) and the process terminates thereafter.

Turning now to FIG. 1C, a flowchart of an exemplary process for an overlaps method for identifying a list of intersections where current intersection candidate overlaps with resource availability is depicted in accordance with an illustrative embodiment of the present invention. As shown in FIG. 1C, the process begins when the overlaps method is invoked (step 1130). Next, the overlaps method selects the next resource availability from the list of resource availabilities (step 1132).

The overlaps method then makes a determination as to whether the next resource availability overlaps with the current intersection candidate (step 1134). If no overlap is found, the process continues to step 1138. If overlap is found, the method identifies where the current candidate and resource availability overlap and adds the intersection to a list of intersection (step 1136). The process continues to step 1138.

At step 1138, a determination is made by the overlaps method as to whether additional resource availability is present in the resource availability list (step 1138). If additional resource availability is present, the process returns to step 1132 to select the next resource availability. Otherwise, the list of intersections is returned to the intersection method (step 1140) and the process terminates thereafter.

In summary, the present invention provides a simpler solution to determine the availability of resources using multiple time domains. With the scheduled resource class and the reservation class, a user may easily query for a list of availabilities based on required units, duration and start time. In addition, the user may also determine whether resources available at a given time. In this way, management and reporting of resource availability are greatly improved.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system comprising:
    a bus;
    a memory connected to the bus, wherein a set of instructions are located in the memory; and
    a processing unit connected to the bus, wherein the processing unit executes the set of instructions to create a set of segments for a list of reservations;

determine, for each segment in the set, if resources are available based on a number of required resources of the query; combine adjacent reservations remove from the list of resource availabilities reservations having shorter durations than duration of the query if resources are available to form a final list of resource availabilities; and return the final list of resource availabilities;

wherein the processing unit, in executing the set of instructions to determine if resources are available;

determines if a number of available resources is one of greater than and equal to a sum of the number of required resources of the query and a number of allocated resources;

creates a first new reservation entry for duration of each segment if the number of available resources is one of greater than and equal to the sum of the number of required resources of the query and the number of allocated resources; and adds the first new reservation entry to the list of resource availabilities;

wherein the processing unit, in executing the set of instructions to combine adjacent reservations, determines, for each first new reservation entry in the list of resource availabilities;

if end time of the first new reservation entry is equal to start time of next reservation entry in the list;

creates a second new reservation entry for a combined duration of the first new reservation entry and the next reservation entry; and sets the second new reservation entry as the first new reservation entry in the list.

2. The data processing system of claim 1, wherein the processing unit, in executing the set of instructions to remove from the list of resource availabilities reservations having shorter durations than duration of the query step, determines, for each new reservation entry in the list, if duration of the first new reservation entry is shorter duration than duration of the query; and removes the first new reservation entry from the list if duration of the first new reservation entry is shorter duration than the duration of the query.

3. A computer program product in a non-transitory computer readable storage medium for determining data center resources availability, the computer program product comprising:

first instructions for creating a set of segments for a list of reservations responsive to a query for a list of resource availabilities;

second instructions for determining, for each segment in the set, if resources are available based on a number of required resources of the query, wherein the second instructions comprises:

first sub-instructions for determining if a number of available resources is one of greater than and equal to a sum of the number of required resources of the query and a number of allocated resources;

second sub-instructions for creating a first new reservation entry for duration of each segment if the number of available resources is one of greater than and equal to the sum of the number of required resources of the query and the number of allocated resources; and third sub-instructions for adding the first new reservation entry to the list of resource availabilities;

third instructions for combining adjacent reservations and removing from the list of resource availabilities reservations having shorter durations than duration of the query if resources are available to form a final list of resource availabilities; and fourth instructions for returning the final list of resource availabilities, wherein the third instructions comprises:

first sub-instructions for determining, for each first new reservation entry in the list of resource availabilities, if end time of the first new reservation entry is equal to start time of next reservation entry in the list;

second sub-instructions for creating a second new reservation entry for a combined duration of the first new reservation entry and the next reservation entry; and third sub-instructions for setting the second new reservation entry as the first new reservation entry in the list.

4. The computer program product of claim 3, wherein the third instructions further comprises:

fourth sub-instructions for determining, for each new reservation entry in the list, if duration of the first new reservation entry is shorter duration than duration of the query; and fifth sub-instructions for removing the first new reservation entry from the list if duration of the first new reservation entry is shorter duration than the duration of the query.

* * * * *